United States Patent
Liu et al.

(10) Patent No.: US 9,228,133 B2
(45) Date of Patent: Jan. 5, 2016

(54) METHOD FOR REFINING OIL

(75) Inventors: Chiung-Fang Liu, Taipei (TW);
Ching-I Juch, New Taipei (TW);
Chih-Hao Chen, Hsinchu (TW);
Chih-Ching Chen, New Taipei (TW);
Ju-Shiou Chen, Keelung (TW);
Ying-Hsi Chang, Taoyuan County (TW); Hou-Peng Wan, Taoyuan County (TW); Hom-Ti Lee, Hsinchu County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 896 days.

(21) Appl. No.: 13/458,144

(22) Filed: Apr. 27, 2012

(65) Prior Publication Data

US 2012/0215044 A1  Aug. 23, 2012

(51) Int. Cl.
*C07C 1/00* (2006.01)
*C10G 3/00* (2006.01)

(52) U.S. Cl.
CPC .. *C10G 3/45* (2013.01); *C10G 3/50* (2013.01); *C10G 2300/1007* (2013.01); *C10G 2300/1011* (2013.01); *C10G 2300/1062* (2013.01); *C10G 2300/4018* (2013.01); *Y02E 50/13* (2013.01)

(58) Field of Classification Search
CPC ............... C10G 47/00; C10G 49/02; C10G 2300/1003; C10G 2300/1011; C10G 2300/70; C10L 9/04; C10L 1/16
USPC ........................................ 585/240, 242, 14
See application file for complete search history.

(56) References Cited

U.S. PATENT DOCUMENTS

| | | | |
|---|---|---|---|
| 2,960,459 A | 11/1960 | Reif et al. | |
| 4,795,841 A | 1/1989 | Elliott et al. | |
| 5,180,868 A | 1/1993 | Baker et al. | |
| 5,705,722 A | 1/1998 | Monnier et al. | |
| 6,172,272 B1 | 1/2001 | Shabtai et al. | |
| 2003/0115792 A1 | 6/2003 | Shabtai et al. | |
| 2006/0264684 A1 | 11/2006 | Petri et al. | |
| 2007/0015947 A1 | 1/2007 | Marker | |
| 2007/0131579 A1 | 6/2007 | Koivusalmi et al. | |
| 2007/0135666 A1 | 6/2007 | Koivusalmi et al. | |
| 2007/0135669 A1 | 6/2007 | Koivusalmi et al. | |
| 2007/0161832 A1 | 7/2007 | Myllyoja et al. | |
| 2008/0050792 A1 | 2/2008 | Zmierczak et al. | |
| 2008/0053870 A1 | 3/2008 | Marker et al. | |
| 2008/0253948 A1 | 10/2008 | Gatineau et al. | |
| 2009/0163744 A1 | 6/2009 | Abhari et al. | |
| 2009/0247799 A1 | 10/2009 | Myllyoja et al. | |
| 2009/0259082 A1 | 10/2009 | Deluga et al. | |
| 2010/0000908 A1 | 1/2010 | Markkanen et al. | |
| 2010/0317822 A1* | 12/2010 | Boussie et al. | 528/288 |
| 2012/0016167 A1* | 1/2012 | Hanks | 585/14 |

FOREIGN PATENT DOCUMENTS

| | | |
|---|---|---|
| CN | 1184144 | 6/1998 |
| CN | 1255407 A | 6/2000 |
| CN | 1624080 | 6/2003 |
| CN | 1640990 | 7/2005 |
| CN | 101003014 A | 7/2007 |
| CN | 101353583 A | 1/2009 |
| CN | 101724428 A | 6/2010 |
| JP | 64036694 | 2/1989 |

OTHER PUBLICATIONS

Chinese Office Action for Chinese Application No. 201010541411.3 dated Jun. 6, 2013.

* cited by examiner

*Primary Examiner* — Nina Bhat
(74) *Attorney, Agent, or Firm* — Muncy, Geissler, Olds & Lowe, P.C.

(57) ABSTRACT

A method for refining oil includes contacting an oil with hydrogen to perform a hydrodeoxygenation reaction using iron oxide as a catalyst. The iron oxide comprises ferrous oxide (FeO), ferrum dioxide (FeO$_2$), ferric oxide (Fe$_2$O$_3$), ferroferric oxide (Fe$_3$O$_4$), or combinations thereof.

8 Claims, No Drawings

METHOD FOR REFINING OIL

TECHNICAL FIELD

The technical field relates to a method for refining oil, and in particular relates to a method for refining oil by catalytic hydrogenation.

BACKGROUND

Oil can be refined generally by catalytic degradation or catalytic hydrogenation. Catalytic degradation is usually performed under atmospheric pressure at a high temperature. Liquid fuel can be obtained by controlling the vaporized hydrocarbons by catalytic pores. The yield is usually about 25 wt %. On the other hand, catalytic hydrogenation is usually performed under high pressure at a high temperature, for example, at a temperature of about 300° C. to about 500° C., and under a pressure of about 5 MPa to about 30 MPa (about 50 atm to about 200 atm.). Catalysts used in catalytic hydrogenation include noble metal, metal sulfide, and etc. However, these catalysts are usually difficult to be recycled. Moreover, conversion rate of oil is usually between about 30 wt % and 70 wt % depending on the catalyst used and reaction condition.

In general, chemical compositions of biomass oil and waste oil (including waste lubricating oil, waste turbine oil, or the like) are complex and are difficult to be used directly for their high oxygen content, low heat value (about 3000 kcal/kg to about 4000 kcal/kg), and high viscosity (over 40 cps.) Therefore, the oil needs to be refined before recycling.

However, although refined biomass oil and waste oil can be recycled as an alternative energy source, the oil refining process requires high temperature, high pressure, and expensive catalysts and has a poor oil conversion rate and thus can not meet commercial requirements.

Therefore, a novel method for refining oil with lower operation temperature and pressure is desired.

SUMMARY

In one embodiment of the disclosure, a method for refining oil includes contacting an oil with hydrogen to perform a hydrodeoxygenation reaction using iron oxide as a catalyst, wherein the iron oxide comprises ferrous oxide (FeO), ferrum dioxide ($FeO_2$), ferric oxide ($Fe_2O_3$), ferroferric oxide ($Fe_3O_4$), or combinations thereof.

A detailed description is given in the following embodiments.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

A method for refining oil is provided, wherein iron oxide is used as a catalyst in a hydrodeoxygenation reaction. In a preferable embodiment, the hydrodeoxygenation reaction is performed in a sub-critical $CO_2$ flow.

In one embodiment, the refined oil may include biomass degraded oil, biomass diesel oil, lubricating oil, edible oil, plastics degraded oil, tire pyrolysis oil, or combinations thereof. The biomass degraded oil contain about 3 wt % to 70 wt % of water, for example. The method is suitable for refining high oxygen content (about 35 wt % to about 40 wt %) biomass oil, which conventionally can only be refined under high pressure and high temperature. In addition, the method can also be used to refine other kinds of oils such as those of low oxygen content.

After the oil is placed in a metal reactor, iron oxide is added into the reactor as a catalyst. The iron oxide may include ferrous oxide (FeO), ferrum dioxide ($FeO_2$), ferric oxide ($Fe_2O_3$), ferroferric oxide ($Fe_3O_4$), or combinations thereof.

In one embodiment, the iron oxide catalyst is magnetite powder which is manufactured by dissolving raw material, mineral, or industrial metal waste by acid and then precipitating by a basic solution. Starting materials for manufacturing the iron oxide could be raw material, mineral, or industrial metal waste containing more than 35 wt % of iron, wherein the iron could be in a form of elemental iron, iron oxide, or alloy of iron oxide and other metals. Examples of iron oxide could include ferrous oxide (FeO), ferrum dioxide ($FeO_2$), ferric oxide ($Fe_2O_3$), or ferroferric oxide ($Fe_3O_4$). Examples of alloys of iron oxide and other metals could include $MFe_2O_4$, wherein M is a divalent metal other than iron. When the starting material is a liquid, its pH value can be directly adjusted by acid. When the starting material is in its solid state, it should be grinded until its particle size is less than 1 mm, such that the starting material can be dissolved into acid rapidly. The acid could be HCl or other strong acid with a pH value between 0 and 2. Then, the mixture is filtered to remove the undissolved part. Next, a basic solution is added into the acidic solution to neutralize the solution, wherein iron ions will form $Fe_3O_4$ in this step. The basic solution may be a weaker base such as ammonium so that the neutralization reaction will not be too vigorous. Finally, the neutralized solution is filtered to obtain the magnetite powder. For detailed description related to the magnetite powder, reference may be made to the Applicant's previous Taiwan Patent Application No. 201012915. However, it should be appreciated that the magnetite powder is merely an example, and the scope of the invention is not limited to the magnetite powder of the referenced Application.

Compared to conventional catalysts such as noble metal (for example, Pt) or metal sulfide, the cost of the oil refining process can be decreased because of using the magnetite powder as a catalyst. The magnetite powder has a higher specific surface, and therefore the hydrogenation reaction rate can be increased. In addition, the magnetite powder has a higher specific heat than that of the noble metals, and thus the heat conducting efficiency can be increased. Furthermore, after the reaction, the magnetite powder can be easily recycled due to their magnetic property, and therefore the cost of refining oil can be decreased.

In one embodiment, the magnetite powder contains between 60 wt % and 95 wt % of $Fe_3O_4$, or between 85 wt % and 95 wt % of $Fe_3O_4$. The magnetite powder have a specific surface area of about 15 $m^2/g$ to about 40 $m^2/g$, or about 30 $m^2/g$ to about 40 $m^2/g$. The magnetite powder have a specific heat of about 0.1 cal/g° C. to about 0.4 cal/g° C. The magnetite powder have a saturated magnetic intensity larger than about 15 emu/g.

In another embodiment, the oil also is refined by commercial magnetite powder or other kinds of magnetite powder as a catalyst.

According to an embodiment using the magnetite powder as a catalyst, a product conversion rate could be above about 50 wt %, or above about 80 wt %, more or above about 90 wt %.

The sub-critical $CO_2$ liquid could be used to decrease the viscosity of the reactant by the expanding volume. Moreover, the sub-critical $CO_2$ liquid can increase the solubility of hydrogen toward the oil, resulting in accelerating the reaction between the reactant and the catalyst. Therefore, the conversion rate of the oil can be improved, and the required reaction temperature and pressure can be decreased.

When the sub-critical $CO_2$ liquid is used in the oil refining process, the conversion rate of the oil will increase with the increase of the temperature or the weight hourly space velocity (WHSV). Therefore, the conversion rate of oil can be improved by adjusting the molar ratio of $CO_2$ to hydrogen without changing the temperature. In one embodiment, the molar ratio of $CO_2$ to hydrogen is between 0.1 and 1.0. When the molar ratio of $CO_2$ to hydrogen is less than 0.1, the solubility of the hydrogen could not be improved. When the molar ratio of $CO_2$ to hydrogen is higher than 1.0, the amount of hydrogen could be too small such that the hydrogenation reaction rate could decrease.

In a reaction using the sub-critical $CO_2$ liquid, the hydrodeoxygenation reaction temperature could be at least about 240° C., or between 280° C. and 320° C. A pressure of the reaction may be at least about 5 atm, or between 5 atm and 50 atm. A weight hourly space velocity (WHSV) of the reaction may be at least 5 $h^{-1}$, or between 5 $h^{-1}$ and 20 $h^{-1}$, wherein the definition of the weight hourly space velocity (WHSV) could be presented as follow:

$$WHSV(h^{-1}) = \frac{\text{Weight of feed flowing}}{\text{Weight of catalyst in the reactor} \times \text{Time}}$$

In one embodiment, a method for refining oil includes performing a hydrodeoxygenation reaction using iron oxide as a catalyst. Conventionally, the hydrodeoxygenation reaction needs to be performed at a high temperature (about 300° C. to 500° C.) under high pressure (about 50 atm to 200 atm,) and the resulting oil conversion rate would be between 30 wt % and 70 wt %. However, in various embodiments of the disclosure, an oil refining process can be performed at a lower temperature and pressure, with the oil conversion rate reaching over 60 wt %. In one embodiment, a biomass oil or waste oil which contains high viscosity, a complicated chemical composition, and a high oxygen content is refined. In the oil refining process according to various embodiments, viscosity and density of the oil could be decreased and the heat value of the oil could be increased. Moreover, the oil conversion rate is also improved. In one embodiment, magnetite powder is used as a catalyst in the hydrodeoxygenation reaction, wherein the magnetite powder has good thermal conductivity, high specific surface area, high stability, and magnetic property. In addition, the sub-critical $CO_2$ liquid is also used in the process, and thus the viscosity of the reactant can be decreased and the solubility of the hydrogen can be increased. Therefore, the reactant could be brought into the catalyst rapidly. Therefore, the reaction rate may be improved, and the required reaction temperature, reaction pressure, the energy consumption, and the cost could be decreased.

Comparative Example 1

A mixture containing A mixture containing 5 wt % of guaiacol and 95 wt % of n-tetradecane ($CH_3(CH_2)_{12}CH_3$) was placed into a metal reactor. Pd/$ZrO_2$ was added into the reactor as a catalyst to perform a hydrodeoxygenation reaction at about 280° C. to refine oil. The guaiacol was a main derivative of liglin in biomass. In various examples of the disclosure, the guaiacol was used to evaluate the selected catalysts and operation condition in an oil refining process. N-tetradecane was used as a carrier of the hydrogen, and $ZrO_2$ was used as a carrier of the Pd catalyst.

In the oil refining process, the pressure of hydrogen was about 50 atm (at about 25° C.,) and the WHSV was about 10 $h^{-1}$. The conversion rate of the guaiacol was 99.32% as determined by a GC-MS. The main product of the reaction was benzene.

Example 1

A mixture containing 5 wt % of guaiacol and 95 wt % of n-tetradecane ($CH_3(CH_2)_{12}CH_3$) was placed into a metal reactor. Magnetite powder was added into the reactor as a catalyst to perform a hydrodeoxygenation reaction at about 280° C. to refine oil.

In the oil refining process, the pressure of hydrogen was about 50 atm (at about 25° C.,) and the WHSV was about 10 $h^{-1}$. The conversion rate of the guaiacol was 99.97% as determined by a GC-MS.

Compared to the comparative example 1, the catalyst magnetite powder used as a catalyst was cheaper than that of the noble metal catalyst (Pd/$ZrO_2$) and the oil conversion rate was higher.

Example 2

A mixture containing 5 wt % of guaiacol and 95 wt % of n-tetradecane ($CH_3(CH_2)_{12}CH_3$) was placed into a metal reactor. $Fe_2O_3$ was added into the reactor as a catalyst to perform a hydrodeoxygenation reaction at about 280° C. to refine oil.

In the oil refining process, the pressure of hydrogen was about 50 atm (at about 25° C.,) and the WHSV was about 10 $h^{-1}$. The conversion rate of the guaiacol was 99.14% as determined by a GC-MS.

Compared to the comparative example 1, the catalyst $Fe_2O_3$ used as a catalyst was cheaper than that of the noble metal catalyst (Pd/$ZrO_2$) and the oil conversion rate was still good.

Example 3

A mixture containing 5 wt % of guaiacol and 95 wt % of n-tetradecane ($CH_3(CH_2)_{12}CH_3$) was placed into a metal reactor. FeO powder was added into the reactor as a catalyst to perform a hydrodeoxygenation reaction at about 280° C. to refine oil.

In the oil refining process, the pressure of hydrogen was about 50 atm (at about 25° C.,) and the WHSV was about 10 $h^{-1}$. The conversion rate of the guaiacol was 52.87% as determined by a GC-MS.

Example 4

A mixture containing 5 wt % of guaiacol and 95 wt % of n-tetradecane ($CH_3(CH_2)_{12}CH_3$) was placed into a metal reactor. Magnetite powder was added into the reactor as a catalyst to perform a hydrodeoxygenation reaction. The reaction condition was designed according to Taguchi's method with four key factors and three levels to evaluate the relationship between the conversion rate and various factors. The reaction was performed under the following conditions: the reaction temperatures were set at 240° C., 280° C., and 320° C. respectively; the levels of the hydrogen pressure were under 5 atm, 25 atm, and 50 atm respectively (at about 25° C.); the WHSV were 5 $h^{-1}$, 10 $h^{-1}$, and 20 $h^{-1}$ respectively;

the molar ratio of $CO_2$ to $H_2$ were 0, 0.5, and 0.9 respectively. The results are shown in Table 1.

TABLE 1

| T (°C.) | P (atm) @ 25° C. | WHSV (h$^{-1}$) | CO$_2$ | Conversion Rate (%) (Repeat experiments (N)) | | |
|---|---|---|---|---|---|---|
| | | | | N-1 (%) | N-2 (%) | N-3 (%) |
| 240 | 5 | 5 | 0 | 65.5 | 52.77 | |
| 240 | 25 | 10 | 0.5 | 77.92 | 76.8 | 62.68 |
| 240 | 50 | 20 | 0.9 | 35.75 | 31.24 | |
| 280 | 5 | 10 | 0.9 | 59.73 | 54 | 52.4 |
| 280 | 25 | 20 | 0 | 76.36 | 77 | |
| 280 | 50 | 5 | 0.5 | 99.56 | 99.88 | |
| 320 | 5 | 20 | 0.5 | 99.2 | 98.12 | |
| 320 | 25 | 5 | 0.9 | 96.2 | 98.98 | |
| 320 | 50 | 10 | 0 | 99.2 | 99.6 | |

According to the nine examples listed in Table 1, the conversion rate of guaiacol had the highest correlation with the reaction temperature, followed by the $CO_2$ ratio, WHSV, and then pressure. In addition, the conversion rate of guaiacol increased when the temperature and/or the WHSV increased. However, the $CO_2$ ratio and the pressure had an applicable range to achieve a high conversion rate. The molar ratio of $CO_2$ to $H_2$ was between 0.1 and 0.9. In other words, the molar ratio of $CO_2$ to $H_2$ was an important factor to lower down the reaction temperature.

According to the examples, the reaction could be performed under 5 atm while having a conversion rate of over 99% by using $CO_2$ and adjusting the temperature and the catalyst loading amount. Accordingly, advantages of using sub-critical $CO_2$ included an expansion effect toward organic solvents, improved solubility of hydrogen, decreased liquid viscosity, and increased diffusion rate of the substrate. Thus, the reaction rate of hydrodeoxygenation reaction of oil was improved, and the reaction temperature, reaction pressure were decreased.

Example 5

A mixture containing 5 wt % of guaiacol and 95 wt % of n-tetradecane ($CH_3(CH_2)_{12}CH_3$) was placed into a metal reactor. Magnetite powder was added into the reactor as a catalyst to perform a hydrodeoxygenation reaction. The reaction condition was performed according to the best mode in Taguchi's method in example 4. The reaction temperature was 320° C. The level of the hydrogen pressure was under 25 atm. The WHSV was 5 h$^{-1}$. The molar ratio of $CO_2$ to $H_2$ was 1. The conversion rate was 99.95%. By using $CO_2$, the desired conversion rate could be achieved with a decreased reaction by ½, and decreased hydrogen loading amount by ¾.

Example 6

A mixture containing 5 wt % of guaiacol and 95 wt % of n-tetradecane ($CH_3(CH_2)_{12}CH_3$) was placed into a metal reactor. $Fe_2O_3$ was added into the reactor as a catalyst to perform a hydrodeoxygenation reaction. The reaction condition was performed according to the best mode in Taguchi's method in example 4. The reaction temperature was 320° C. The level of the hydrogen pressure was under 25 atm. The WHSV was 5 h$^{-1}$. The molar ratio of $CO_2$ to $H_2$ was 1. The conversion rate was 98.27%. By using $CO_2$, the desired conversion rate could be achieved with decreased reaction pressure by ½, and decreased hydrogen loading amount by ¾.

Example 7

A mixture containing 5 wt % of guaiacol and 95 wt % of n-tetradecane ($CH_3(CH_2)_{12}CH_3$) was placed into a metal reactor. FeO powder was added into the reactor as a catalyst to perform a hydrodeoxygenation reaction. The reaction condition was performed according to the best mode in Taguchi's method in example 4. The reaction temperature was 320° C. The level of the hydrogen pressure was under 25 atm. The WHSV was 5 h$^{-1}$. The molar ratio of $CO_2$ to $H_2$ was 1. The conversion rate was 98.27%. By using $CO_2$, the desired conversion rate could be achieved with decreased reaction pressure by ½, and decreased hydrogen loading amount by ¾.

In the examples, iron oxide such as FeO, $Fe_2O_3$, or magnetite powder, was used as a catalyst. In the present of sub-critical $CO_2$, biomass oil or waste oil was refined. The catalysts used in the examples were cheaper than those of the conventional ones, but the reaction temperature and reaction pressure were decreased while the conversion rate remained. Therefore, the cost of oil refining was decreased.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for refining oil, comprising:
   contacting an oil with hydrogen to perform a hydrodeoxygenation reaction using iron oxide as a catalyst, wherein the iron oxide comprises ferrous oxide (FeO), ferrum dioxide ($FeO_2$), ferric oxide ($Fe_2O_3$), ferroferric oxide ($Fe_3O_4$), or combinations thereof, wherein the hydrodeoxygenation reaction is performed in the presence of hydrogen and sub-critical $CO_2$ liquid, and wherein the molar ratio of $CO_2$ to hydrogen is between 0.1 and 1.0.

2. The method for refining oil as claimed in claim 1, wherein the oil comprises biomass degraded oil, biomass diesel oil, lubricating oil, edible oil, plastics degraded oil, tire pyrolysis oil, or combinations thereof.

3. The method for refining oil as claimed in claim 1, wherein the hydrodeoxygenation reaction is performed at a temperature of no less than 240° C.

4. The method for refining oil as claimed in claim 3, wherein the hydrodeoxygenation reaction is performed at 240° C. to 320° C.

5. The method for refining oil as claimed in claim 1, wherein the hydrodeoxygenation reaction is performed under a pressure of no less than 5 atm.

6. The method for refining oil as claimed in claim 5, wherein the hydrodeoxygenation reaction is performed under 5 atm to 50 atm.

7. The method for refining oil as claimed in claim 1, wherein a weight hourly space velocity (WHSV) of the hydrodeoxygenation reaction is no less than 5 h$^{-1}$.

8. The method for refining oil as claimed in claim 7, wherein a weight hourly space velocity (WHSV) of the hydrodeoxygenation reaction is between 5 h$^{-1}$ and 20 h$^{-1}$.

* * * * *